United States Patent Office 3,471,270
Patented Oct. 7, 1969

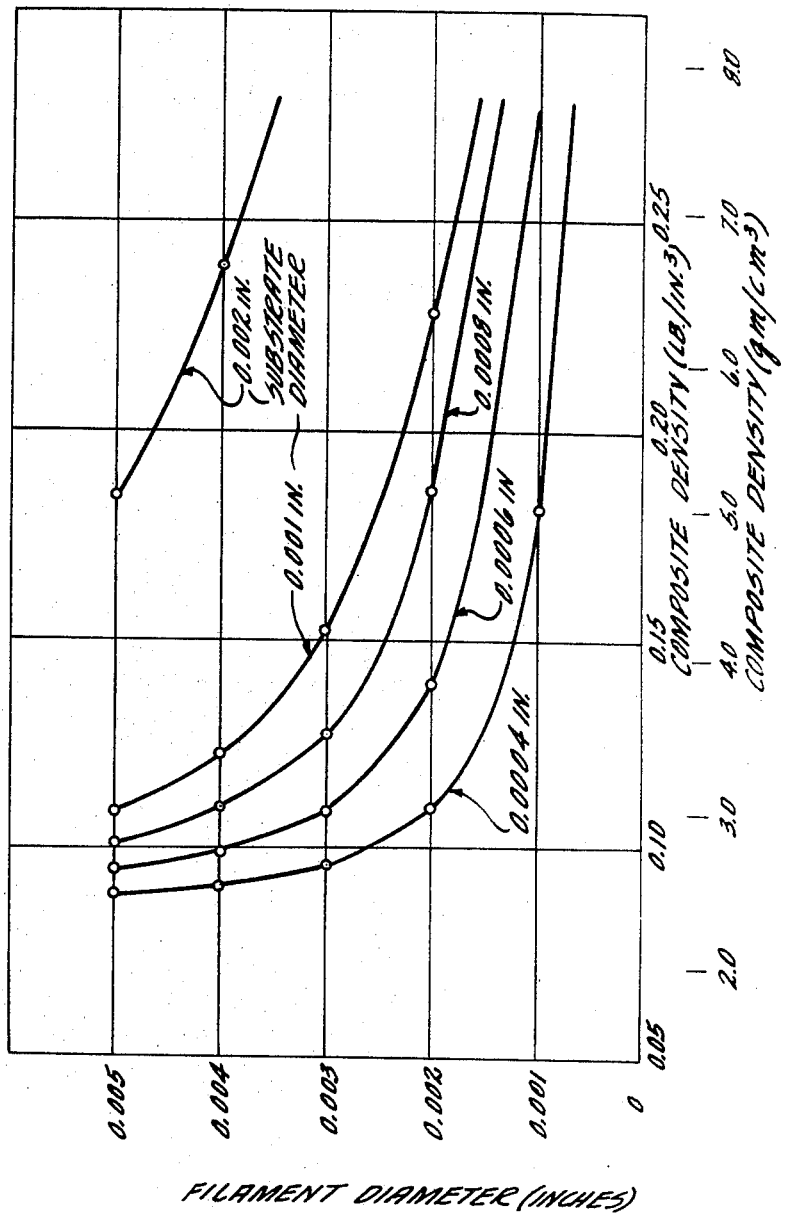

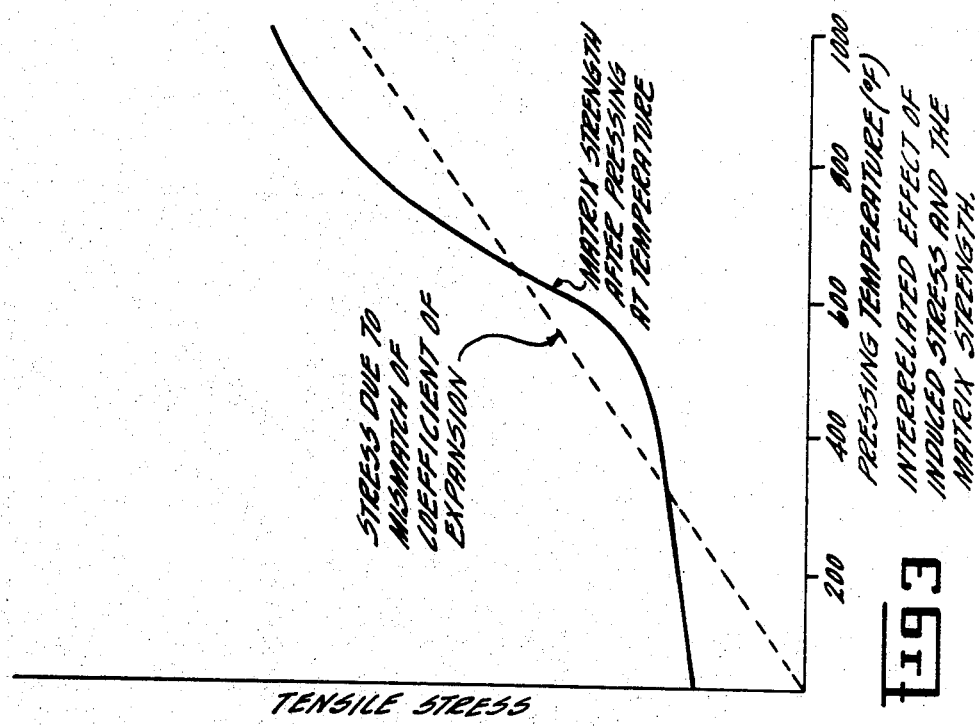
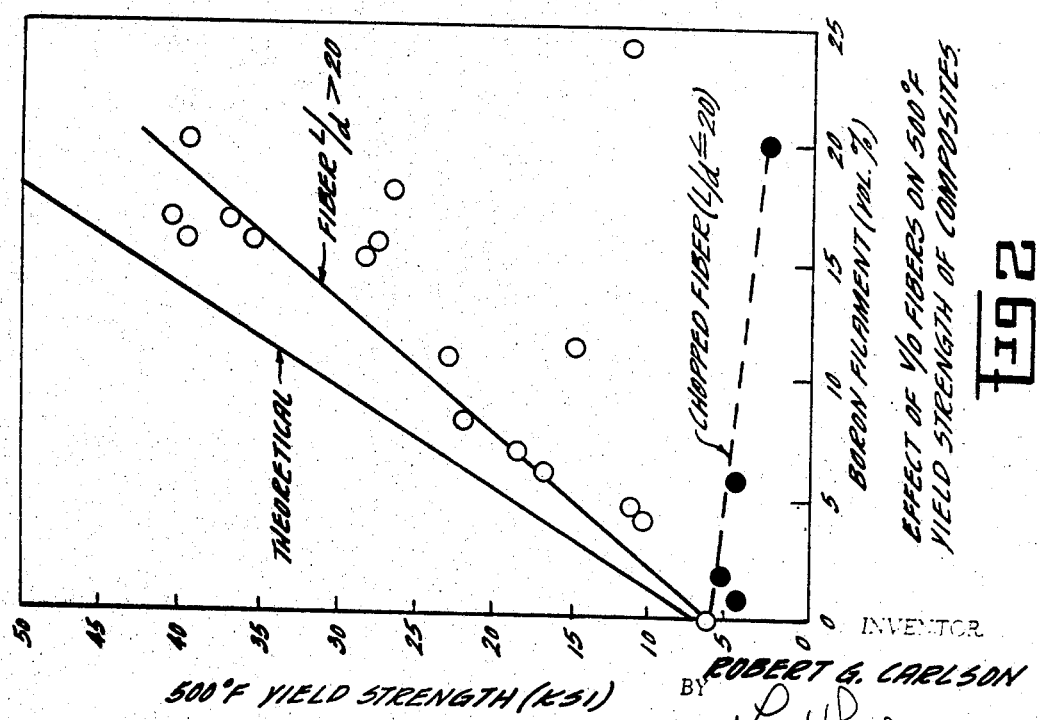

3,471,270
COMPOSITE MATERIAL AND METHOD
FOR MAKING
Robert Gustav Carlson, Greenhills, Ohio, assignor to
General Electric Company, a corporation of New
York
Filed Sept. 1, 1965, Ser. No. 484,331
Int. Cl. B22f 3/10, 3/12
U.S. Cl. 29—182.2        7 Claims

ABSTRACT OF THE DISCLOSURE

A fiber strengthened composite material includes a non-porous metallic matrix of aluminum, titanium or their alloys and a plurality of 0.005" maximum diameter continuous metallic fibers throughout the length of the material so that the fibers avoid contact one with the other. The method for making the material includes heating the fiber-matrix combination from about 250° F. to less than 350° F. under a pressure of less than 80,000 p.s.i. followed by relatively slow cooling to provide good fiber matrix bonding.

---

This invention relates to composite materials and, more particularly to metallic composites reinforced with oriented metallic fibers.

The advance of aircraft and aircraft engine technology is becoming increasingly more dependent upon the development of newer and more complex materials in order to attain high thrust-to-weight ratios. Composite structures including high strength "whisker-like" filaments have given impetus to the development of composite material structures utilizing boron as the high strength supporting member. Metals are a more convenient matrix material for such composites than are plastics or ceramics because they possess a reasonable ductility along with higher temperature capability. If an applied load can be transferred efficiently to the high strength supporting member by matrix plastic deformation as a result good bonding between the high strength supporting member and the matrix, the resulting composites can provide an improved and significantly useful structure material for the higher temperature regions.

It is a primary object of the present invention to provide an improved composite metallic material strengthened by metallic high strength supporting members.

Another object is to provide an improved metallic fiber reinforced aluminum base structure capable of use at temperatures up to about 500° F.

Still another object is to provide an improved method for making such a composite material.

These and other objects and advantages will be more readily understood and recognized from the following detailed description, from the examples and from the drawing in which:

FIG. 1 is a graphical representation of the relationship between the density of a composite and the diameter of boron coated filaments at various filament substrate diameters;

FIG. 2 is a graphical representation of the effect of volume percent of filaments in the composite on the composite's 500° F. yield strength; and FIG. 3 is a graphical comparison of factors relating composite strength to strength of bond between fibers and matrix.

It has been founde that a high strength-to-weight metallic composite strengthened by fibers or filaments, the composite preferably having a density of about 2.5 grams per cubic centimeter, can be provided by combining a substantially non-porous metallic matrix of a low density metal such as aluminum, titanium and their alloys with a plurality of continuous metallic fibers symmetrically distributed in the matrix and aligned substantially along the tensile axis of the composite material in a manner which avoids fiber-to-fiber contact. Unusual properties can be obtained and the high strength-to-weight ratio can be retained provided the continuous fibers have an overall diameter of about 0.001–0.005" and a length-to-diameter ratio greater than 20. The ultimate tensile strength of the fibers are greater than that of the matrix and the fibers are held securely by the matrix to allow a high transfer efficiency of tensile stress from the fiber to the matrix.

In a more specific form, the composite material of the present invention comprises a matrix of aluminum and a plurality of continuous boron coated tungsten fibers at a volume percent of less than 23% symmetrically distributed in the matrix with the diameter of the tungsten substrate or core being in the range of from about 0.004" to less than about 0.002".

In order to provide a high efficiency of transfer of tensile stress from the matrix to the fiber, it has been found that all methods will not result in a satisfactory bond. One method which has been found to be particularly useful in the formation of composites from boron coated tungsten fibers in an aluminum matrix includes heating the aligned fibers in the matrix at a temperature between about 250° F. to less than 350° F. while at the same time applying pressure to the fiber-matrix composite in the range of less than 80,000 pounds per inch and then cooling the composite.

The present invention will be more fully understood from the following detailed description and examples.

One of the basic assumptions for fiber-reinforced composites is that the major portion of the load is carried by the fiber. In order for this to occur, the fibers must be strong, must be held tightly by the martix and must be properly oriented with regard to the direction of the applied load. With all fibers oriented substantially parallel to the loading direction, the load is transferred by shear force at the fiber-matrix interface. These shear stresses are concentrated and maximized at the ends of the fibers and minimized at the center of the fiber lengths. Conversely, the tensile stresses are inversely proportional to the shear stresses. The magnitude of these shear end tensile stresses depends on the aspect ratio (length-to-diameter or l./d.), on the orientation, on the volume fraction of the fiber, on the bond relationship, on the strength of both the matrix and the fiber, and finally on the applied load.

It has been found that a particularly unusual and high strength-to-weight ratio composite can be produced by securing oriented continuous fibers or filaments of particularly sized boron coated tungsten wire oriented symmetrically in a substantially non-porous aluminum matrix. The fiber is continuous along the tensile axis throughout the length of the material or article such as an axial flow compressor blading member made from the material.

The aluminum used in this particular evaluation was unalloyed aluminum powder produced by blowing molten aluminum through fine atomizing nozzles with subsequent screening through a 200 mesh screen. Metallography examination of the powders revealed that the powders were generally spheroidal in shape. To minimize contamination, all powder samples were stored and handled in an argon dry box incorporating a tantalum heater strip to getter residual nitrogen and oxygen.

The tungsten fiber which formed the substrate of the boron coated filament used in the composite structure was coated in a continuous vapor deposition process. Boron was deposited from a mixture of boron trichloride and hydrogen in a process of the type described in "Boron-synthesis, Structure and Properties," edited by Kohn, Nye and Gaule," published by Plenum Press, Inc., New York, 1960.

Because it was recognized that the low aspect ratios (l./d.) in the order of 20 or below or discontinuous fibers resulted in significantly lower composite yield strength than those with ratios greater than 20, the coated filaments were sectioned into various lengths such as 12", 2" and approximately 0.06" for compositing in various specimen sizes with the aluminum powder. In the specimen testing shown here for the high aspect ratio studies, the 12" fibers were used and ran the entire length of the test specimen.

It was recognized that by maintaining the size of the tungsten substrate at less than about 0.002", a continuous boron coated filament having an overall diameter between about 0.001–0.005" could be used with an aluminum matrix to provide a composite material having a density of less than 5 grams per cubic centimeter. The unusual increase in density between the use of a 0.001" and 0.002" tugsten substrate wire is shown in FIG. 1. That figure illustrates the necessity of using a small diameter tungsten substrate in conjunction with a relatively large boron build-up in order to attain low density boron coated tungsten filaments.

A series of evaluations were conducted using continuous boron coated fibers aligned along the tensile axis to avoid fiber-to-fiber contact. The fiber had an overall diameter of 0.003–0.004" on a tungsten substrate having a diameter of 0.0006" in an aluminum matrix. They were prepared according to the conditions shown in the following Table I and tested to determine the 500° F. yield strength of the composite.

how well the fiber is held by or bonded with the matrix thereby allowing a transfer of tensile stress from the matrix to the reinforcing fiber.

Comparing Examples 1, 2 and 3 with Examples 4 and 5 in Table I, it is easily seen that a length-to-diameter ratio of 20 or less results in a significantly lower composite yield strength. These composite yield strengths are no more than and in most cases less than the yield strength of the matrix alone as shown in Examples 18, 19 and 20.

Examples 9, 10, 11 and 13 clearly show that with the type of fibers and matrix tested and prepared in the manner which will be described in more detail later, the inclusion of between about 15–20 volume percent of boron coated tungsten filaments in an aluminum matrix results in an unexpectedly high composite 500° F. yield strength of between 35,000–40,000 p.s.i. combined with a high percentage of theoretical yield strength for the composite. Example 12 shows that with these conditions, a slightly lower volume percent results in a significant decrease in composite yield strength and bonding efficiency. Similarly, Example 17 shows that more than 23 volume percent results in a similar drop in properties.

As will be pointed out in connection with the method of the present invention, there should be maintained during pressing a temperature of less than about 350° F. and a pressure of less than 80,000 p.s.i. This is shown by a comparison of the Example 16 with Examples 10 and 11 wherein substantially the same volume percentage of fiber is used but Example 16 has a significantly lower composite 500° F. yield strength and efficiency factor due to the slightly higher pressing conditions.

Although Examples 6, 7 and 8 have a relatively good bond between the matrix and the fibers, the composite yield strength was relatively low for certain applications. Nevertheless, where only composite yield strengths in the order of about 15,000 p.s.i. maximum are required, volume fractions of as low as about 5 volume percent can be used because of the high percentage of transfer of stress from the matrix to the filament.

As was mentioned above, Examples 18, 19 and 20 give the composite yield strength of the matrix alone and are included for comparison purposes. Average values of the data shown in Table I are presented in the

TABLE I.—BORON COATED TUNGSTEN IN ALUMINUM MATRIX

| Example | Vol. percent | Filament Type | Pressing Conditions | | | Composite 500° F. Yield Str., K s.i. | Percent Theoretical Yield Str. |
|---|---|---|---|---|---|---|---|
| | | | Press., K s.i. | Temp., °F. | Time, min. | | |
| 1 | 1 | (a) | 64 | 250 | .15 | 4.9 | (b) |
| 2 | 2 | (a) | 64 | 250 | .15 | 4.9 | (b) |
| 3 | 20 | (a) | 64 | 250 | .15 | 2.6 | (b) |
| 4 | 3.7 | (c) | 64 | 250 | .15 | 11.0 | 72 |
| 5 | 5.2 | (c) | 64 | 250 | .15 | 15.4 | 78 |
| 6 | 6.0 | (c) | 32 | 275 | 5 | 17.2 | 81 |
| 7 | 6.2 | (c) | 48 | 275 | 5 | 16.0 | 74 |
| 8 | 5.8 | (c) | 64 | 275 | 5 | 18.6 | 90 |
| 9 | 15.8 | (c) | 64 | 250 | 10 | 39.5 | 88 |
| 10 | 15.9 | (c) | 64 | 300 | 10 | 35.7 | 81 |
| 11 | 16.6 | (c) | 64 | 300 | 10 | 40.2 | 85 |
| 12 | 12.2 | (c) | 64 | 350 | 10 | 14.8 | 41 |
| 13 | 19.7 | (c) | 64 | 350 | 10 | 39.8 | 73 |
| 14 | 9.0 | (c) | 80 | 350 | 5 | 17.2 | 60 |
| 15 | 12.0 | (c) | 80 | 350 | 5 | 22.0 | 61 |
| 16 | 16.2 | (c) | 80 | 350 | 5 | 28.2 | 61 |
| 17 | 23.3 | (c) | 80 | 350 | 5 | 13.0 | 21 |
| 18 | 0 | | 64 | 250 | .15 | 5.6 | |
| 19 | 0 | | 64 | 275 | 5 | 6.8 | |
| 20 | 0 | | 80 | 275 | 5 | 5.5 | |

(a) Length-to-diameter of 20 or less.
(b) No more than yield strength of matrix.
(c) Length-to-diameter greater than 20 and fiber continuous in test specimen.

The last column of Table I headed "percent theoretical yield strength" is sometimes referred to as the reinforcement efficiency. It represents a comparison or ratio of the actual composite yield strength as shown by testing to the theoretical composite yield strength. The theoretical composite yield strength is calculated by adding together the product of the volume fraction and the yield strength of the filament with the product of the volume fraction and yield strength of the matrix. The percentage shown in the last column is a measure of graph of FIG. 2 to point out graphically the unusual variation between use of the discontinuous fibers having a low aspect (l./d.) ratio of 20 or less compared with the continuous fiber.

As was mentioned briefly above, the processing conditions are important to the successful production of the composite material of the present invention. One technique which was evaluated consisted of isostatically pressing aligned boron coated tungsten filaments of the type used in the examples shown in Table I in an aluminum matrix at various pressures up to 140,000 p.s.i. followed by sintering at a temperature of 1,050° F. The composite specimens showed no detectable strengthening effect.

Another technique studied consisted of mechanically pressing at room temperature similar aligned filaments in an aluminum matrix. No strengthening effect was noted in this example either. In addition, metallographic observations reveled an excessive amount of filament degradation. From this it was recognized that at higher temperatures, the lower yield stresses of the aluminum should be less detrimental to the filament. Consequently, warm pressing at temperatures up to about 400° F. were studied.

The apparatus used in the warm pressing technique consisted of a tool steel, split die body which contained the specimen between top and bottom tool steel rams. The cavity dimensions in this case were 0.500" wide by 2.50" long with a depth depending upon the specimen charge. The split die was held tightly in position by a U-shaped clamping fixture. The entire apparatus was resistance heated while contained within a removable insulating jacket. The aluminum powder was intermittently added to the die cavity after unidirectional alignment of alternate layers of continuous filament through the specimen. After securing the top ram in position, an initial pressure of approximately 1,600 p.s.i. was applied. Upon reaching the desired temperature controlled by thermocouple inserted into a small bore of the die assembly, the full pressure desired in the test, such as up to 80,000 p.s.i. as shown in Table I, was applied and held for various times up to 50 minutes. At the termination of the pressing cycle, the pressure was removed and the specimen was allowed to cool in the die cavity for reasons which will be discussed in detail later. This method of the present invention produces composites with an intricate filament matrix contact.

Thus it was recognized that warm pressing at temperatures of about 250° F. or above was important to secure the filaments within the aluminum matrix. As shown in Table I and its associated discussion, the temperature of 350° F. was found to be too high. Higher pressing temperatures resulted in lower composite strength and resulted almost consistently in the composite cracking upon subsequent cooling to room temperature. One explanation for this cracking due to higher temperature pressing, based on the difference in coefficients of expansion and the stresses involved, can be seen in FIG. 3. Of the two curves in FIG. 3, the solid one represents the matrix strength as a result of compaction at indicated temperatures. The broken line represents the stress generated due to the mismatch of the coefficients of expansion between fiber and matrix after processing at indicated temperatures and subsequent cooling to room temperature. In the lower temperature area, matrix strengthening occurs mainly by mechanical interlocking of particles. At slightly higher temperatures, the small degree of strengthening results largely from the decreased yield strength which permits a greater degree of powder particle contact. Only at highest temperatures such as 550° F. for aluminum will classical sintering occur thereby producing a high strength compact.

It is to be noted that the induced stress curve crosses the compact strength curve at two points, one at about 350° F. Thus from that point upward within the range of the type of method discussed here, the aluminum matrix would be under tensile stress during cooling and, above a pressing temperature of 350° F. would result in a poor bond between the fibers and the matrix. The second crossing of the two curves suggests that composites such as those of the present invention should be readily composited at higher temperatures by gas pressure bonding techniques. However, the method of the present invention relates to the warm pressing bonding technique described.

As was described above in connection with the method of the present invention, after warm pressing and release of pressure, the specimen is allowed to cool slowly. A study of post-sintering treatments on the 500° F. yield strength was made with composites pressed at 64,000 p.s.i. at a temperature of 275° F. for about 5 minutes. These composites were tested with slow or rapid heat up and with slow or rapid cooling. The results showed that the rate of heating had little effect whereas the rate of cooling had a significant effect upon the 500° F. yield strength and bonding factor. The data is shown in the following Table II.

TABLE II.—POST-PRESSING SINTERING TESTS

| Example | Vol. percent | Sintering Treatment | | Composite 500° F. Yield Str., K s.i. | Percent Theoretical Yield Str. |
|---|---|---|---|---|---|
| | | Heat-up Rate, ° F./hr. | Cooling Rate, ° F./hr. | | |
| 21 | 6.18 | 2,000 | 800 | 16.7 | 78 |
| 22 | 6.44 | 800 | 800 | 17.6 | 80 |
| 23 | 5.26 | 800 | a 4,800 | 12.4 | 64 | a Helium quench (1,050° F. to 250° F. in 10 min.).

With regard to the method of the present invention, it has been found that a post-heat treatment at about 1,050° F. in a vacuum for one hour is advantageous to improve bonding of the aluminum to permit sintering of the aluminum into a contiguous mass to improve bonding. This is particularly useful for the application of composites at temperature of 500° F. or above.

In other tests, composites were formed from titanium and its alloys such as an alloy of, by weight, 6% aluminum, 4% vanadium with the balance titanium. Titanium can be used as the matrix of the composite of the present invention through the use of higher pressing temperatures such as in the range of 1,000–1,650° F. in an inert atmosphere. Above 1,650° F. a reaction between the boron coating and the titanium matrix occurs.

Although the present invention has been described in connection with particular examples, it will be recognized by those skilled in the art the variations and modifications of which the invention is capable within its broad scope.

What is claimed is:

1. A fiber strengthened metallic composite material comprising:
    a substantially non-porous metallic matrix of a low density metal selected from the group consisting of Al, Ti and their alloys; and
    a plurality of continuous metallic fibers symmetrically distributed in the matrix in an amount of about 5 to less than 23 volume percent of the composite material, each fiber aligned substantially along the tensile axis throughout the length of the composite material in a manner which avoids fiber-to-fiber contact;
    the fibers having an overall diameter of about 0.001–0.005", a length-to-diameter ratio of greater than 20 and a tensile yield strength greater than that of the matrix;
    the fibers being held securely by the matrix to allow transfer of tensile stress from the matrix to the fiber.

2. A method for making a metallic composite material comprising the steps of:
    aligning substantially along the tensile axis throughout the length of the composite material a plurality of continuous metallic fibers in an amount of about 5 to less than 23 volume percent of the composite material in a matrix of a powdered metal selected from the group consisting of aluminum, titanium and their alloys, each fiber having an overall diameter of about 0.001–0.005" and a length-to-diameter ratio of greater than 20;
    heating the fiber-matrix arrangement to a temperature from about 250° F. to less than about 350° F., when aluminum is selected and 1,000–1,650° F. when titanium is selected, while at the same time
    applying pressure in a range of about 30,000 p.s.i. to less than about 80,000 p.s.i.; and then
    cooling the composite material thus formed at a rate less than 4,800° F. per hour.

3. The composite material of claim 1 having a density of about 2–5 grams per cubic centimeter in which:
   the matrix is aluminum; and
   the fibers are a tungsten core coated with boron and are in an amount of about 5–20 volume percent of the composite material.

4. The composite material of claim 3 in which the volume percent of fibers is about 15–20 and the tungsten core of the fibers has a diameter of about 0.0004 to less than 0.002″.

5. The material of claim 4 in which the fibers have an overall diameter of about 0.003–0.004″.

6. The method as described in claim 2 in which, after cooling, the composite material is heated in a vacuum at a temperature sufficient to permit sintering of the matrix into a contiguous mass.

7. The method as described in claim 2 in which:
   the fibers are a tungsten core coated with boron;
   the volume percent of the fibers is about 5–20;
   the fiber-matrix arrangement is heated to a temperature from about 250–300° F. when aluminum is selected and 1,000–1,650° F. when titanium is selected; and
   the pressure applied is in the range of about 32,000–64,000 p.s.i.

References Cited

UNITED STATES PATENTS

| | | | |
|---|---|---|---|
| 3,047,383 | 7/1962 | Slayter | 29—191,2 |
| 3,084,421 | 4/1963 | McDanels et al. | 29—183.5 |
| 3,098,723 | 7/1963 | Micks | 29—183.5 |
| 3,147,543 | 9/1964 | Doerner et al. | 75—175.5 |
| 3,282,658 | 11/1966 | Wainer | 29—191.2 |

RICHARD O. DEAN, Primary Examiner

U.S. Cl. X.R.

29—183.5, 191, 191.4; 75—200, 208, 226; 264—111